(12) United States Patent
Yoshida

(10) Patent No.: US 10,399,530 B2
(45) Date of Patent: Sep. 3, 2019

(54) VEHICLE SEAT FRAME

(71) Applicant: TOYOTA BOSHOKU KABUSHIKI KAISHA, Aichi-ken (JP)

(72) Inventor: Kento Yoshida, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/886,229

(22) Filed: Feb. 1, 2018

(65) Prior Publication Data

US 2018/0222428 A1 Aug. 9, 2018

(30) Foreign Application Priority Data

Feb. 8, 2017 (JP) ................... 2017-021081

(51) Int. Cl.
| | |
|---|---|
| *B60N 2/68* | (2006.01) |
| *B60R 21/207* | (2006.01) |
| *B60R 21/215* | (2011.01) |
| *B60R 21/276* | (2006.01) |
| *B60R 21/231* | (2011.01) |

(52) U.S. Cl.
CPC .............. *B60R 21/207* (2013.01); *B60N 2/68* (2013.01); *B60R 21/215* (2013.01); *B60R 21/276* (2013.01); *B60R 2021/23146* (2013.01)

(58) Field of Classification Search
CPC ... B60R 21/207; B60R 21/215; B60R 21/276; B60N 2/68

USPC ................... 280/730.2; 297/452.18
See application file for complete search history.

(56) References Cited

U.S. PATENT DOCUMENTS

| | | | | |
|---|---|---|---|---|
| 6,217,062 B1 * | 4/2001 | Breyvogel | ............... | B60N 2/68 280/728.2 |
| 7,669,888 B2 * | 3/2010 | Sato | ...................... | B60R 21/207 280/730.2 |
| 8,668,225 B2 * | 3/2014 | Yamaki | ............... | B60N 2/4235 280/730.2 |
| 2010/0270846 A1 | 10/2010 | Gleyal et al. | | |

FOREIGN PATENT DOCUMENTS

JP  2010-533616  10/2010

\* cited by examiner

*Primary Examiner* — Syed A Islam
(74) *Attorney, Agent, or Firm* — Greenblum & Bernstein, P.L.C.

(57) ABSTRACT

A vehicle seat frame, which is attached to a vehicle body, includes: a frame body that extends along an outer frame of the vehicle seat frame, the frame body having a hollow space therein, and an airbag that is disposed in the hollow space of the frame body. The airbag is connected to a gas supply device that supplies gas into the airbag to deploy the airbag in the hollow space in a case where an impact equal to or more than a predetermined value is detected by an impact sensor.

11 Claims, 7 Drawing Sheets

VEHICLE SEAT FRAME

CROSS-REFERENCE TO RELATED APPLICATION

This application claims priorities from Japanese Patent Application No. 2017-021081 filed on Feb. 8, 2017, the entire subject matters of which is incorporated herein by reference.

TECHNICAL FIELD

The present disclosure relates to a vehicle seat frame.

BACKGROUND

As one of seat frames of a vehicle seat, there is known a seat frame which includes an outer frame member being a member with a hollow space such as a side frame forming the seat frame and is reinforced by filling the hollow space with foamed resin. In a seat frame disclosed in JP-T-2010-533616, a side frame of a back frame is formed in a member having the hollow space, and the hollow space is filled with foamed resin to reinforce the structure.

In the structure described above, since the hollow space is filled with the foamed resin, when a bending force is applied to the side frame, the cross-sectional shape hardly collapses, so that a bending strength and/or rigidity of the side frame can be improved compared to a case where the hollow space is not filled with the foamed resin. However, there is a problem that a weight of the seat frame is increased by being filled with the foamed resin.

SUMMARY

The present disclosure is made in consideration of the above-mentioned circumstances, and one of objects of the present disclosure is to provide a vehicle seat frame in which an outer frame including a member with a hollow space in order to prevent an increase in weight and to improve strength and/or rigidity.

According to an illustrative embodiment of the present disclosure, there is provided a vehicle seat frame which is attached to a vehicle body, the vehicle seat frame including: a frame body that extends along an outer frame of the vehicle seat frame, the frame body having a hollow space therein, and an airbag that is disposed in the hollow space of the frame body, wherein the airbag is connected to a gas supply device that supplies gas into the airbag to deploy the airbag in the hollow space in a case where an impact equal to or more than a predetermined value is detected by an impact sensor.

According to another illustrative embodiment of the present disclosure, there is provided a vehicle seat frame which is attached to a vehicle body, the vehicle seat frame including: a frame body that extends along an outer frame of the vehicle seat frame, the frame body having an airtight hollow space therein; an impact sensor that detects an impact applied to the vehicle body; and a gas supply device that supplies gas into the hollow space in a case where an impact equal to or more than a predetermined value is detected by the impact sensor.

DETAILED DESCRIPTION

Figure 1:
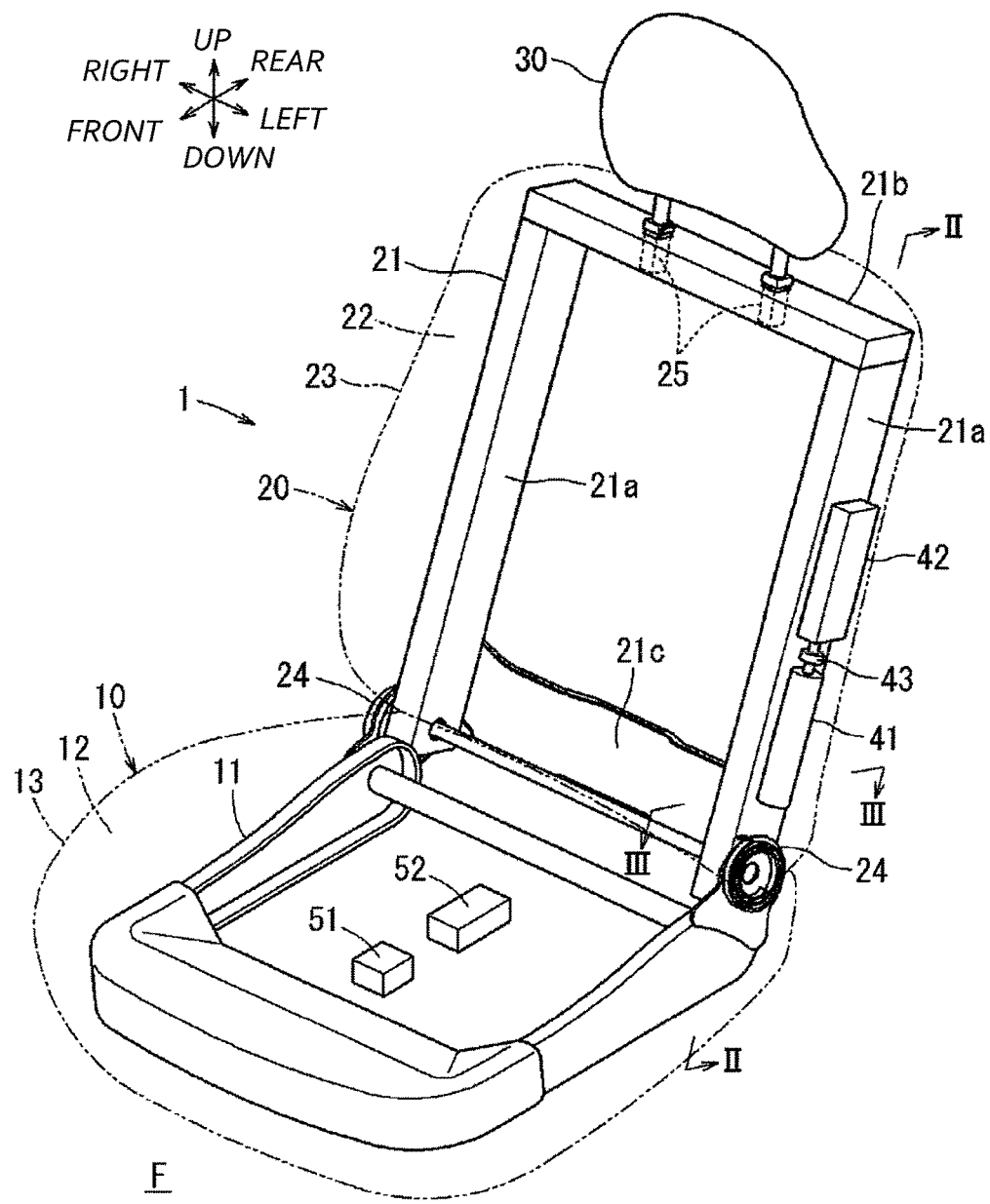
FIG. 1 is a perspective view of a first embodiment of the present disclosure.

FIGS. 1 to 4 illustrate a first embodiment of the present disclosure. The embodiment shows an example of a back frame of a vehicle seat 1. In the drawing, arrows indicate directions of a vehicle and the vehicle seat 1 when the vehicle seat 1 attached with the back frame is mounted in a floor of the vehicle. In the following explanation, the description of directions will be based on these directions.

As illustrated in FIG. 1, the vehicle seat 1 of the embodiment includes a seat cushion 10 which supports a hip part and a thigh part of a sitting occupant as a front left seat, a seat back 20 which supports a lumbar part and a back part of the sitting occupant, and a headrest 30 which supports a head part of the sitting occupant. The seat cushion 10 includes a cushion frame 11 which forms a skeleton, a cushion pad 12 as a cushion member mounted on the cushion frame 11, and a cushion cover 13 as a skin member which covers the surface of the cushion pad 12. The seat back 20 includes a back frame 21 which forms a skeleton, a back pad 22 as a cushion member which is mounted on the back frame 21, and a back cover 23 as a skin member which covers the surface of the back pad 22. In the vehicle seat 1, the lower part of the seat cushion 10 is attached to a floor F. Herein, the floor F corresponds to "vehicle body" described in the scope of claims.

As illustrated in FIG. 1, the back frame 21 is formed in a door shape when viewed from the front side and includes a pair of side frames 21a which extend in the vertical direction on both right and left sides and an upper frame 21b which is provided over between the upper ends of the pair of side frames 21a and connects the side frames. A lower plate 21c is provided in a cross-bar shape for the reinforcement on the lower end side of the pair of side frames 21a. The lower ends of the side frames 21a are connected to the rear ends on both right and left sides of the cushion frame 11 through recliners 24 each serving as a rotation shaft device capable of stopping the rotation. With this configuration, the recliner 24 is held in a rotation stop state in a normal time, and thus the back frame 21 is in a state in which an angle with respect to the cushion frame 11 is fixed. When the rotation stop state of each recliner 24 is released, the angle of the back frame 21 with respect to the cushion frame 11 can be changed in a front and rear direction about the central axis of each recliner 24. The angle with respect to the cushion frame 11 of the back frame 21 illustrated in FIG. 1 is in a standard state in which the seat back 20 is erected at the rear end of the seat cushion 10. The upper frame 21b is formed such that a metallic square pipe having a rectangular cross-sectional surface extends in the right and left direction. In the upper surface and the lower surface of the upper frame 21b, a pair of right and left through holes are provided to pass through in the vertical direction, and a pair of right and left holders 25 of a rectangular pipe shape are inserted and fixed to the through holes so as to support the inserted headrest support. Herein, the back frame 21 corresponds to "vehicle seat frame" described in the scope of claims. The pair of side frames 21a and the upper frame 21b correspond to "outer frame" described in the scope of claims.

Figure 2:
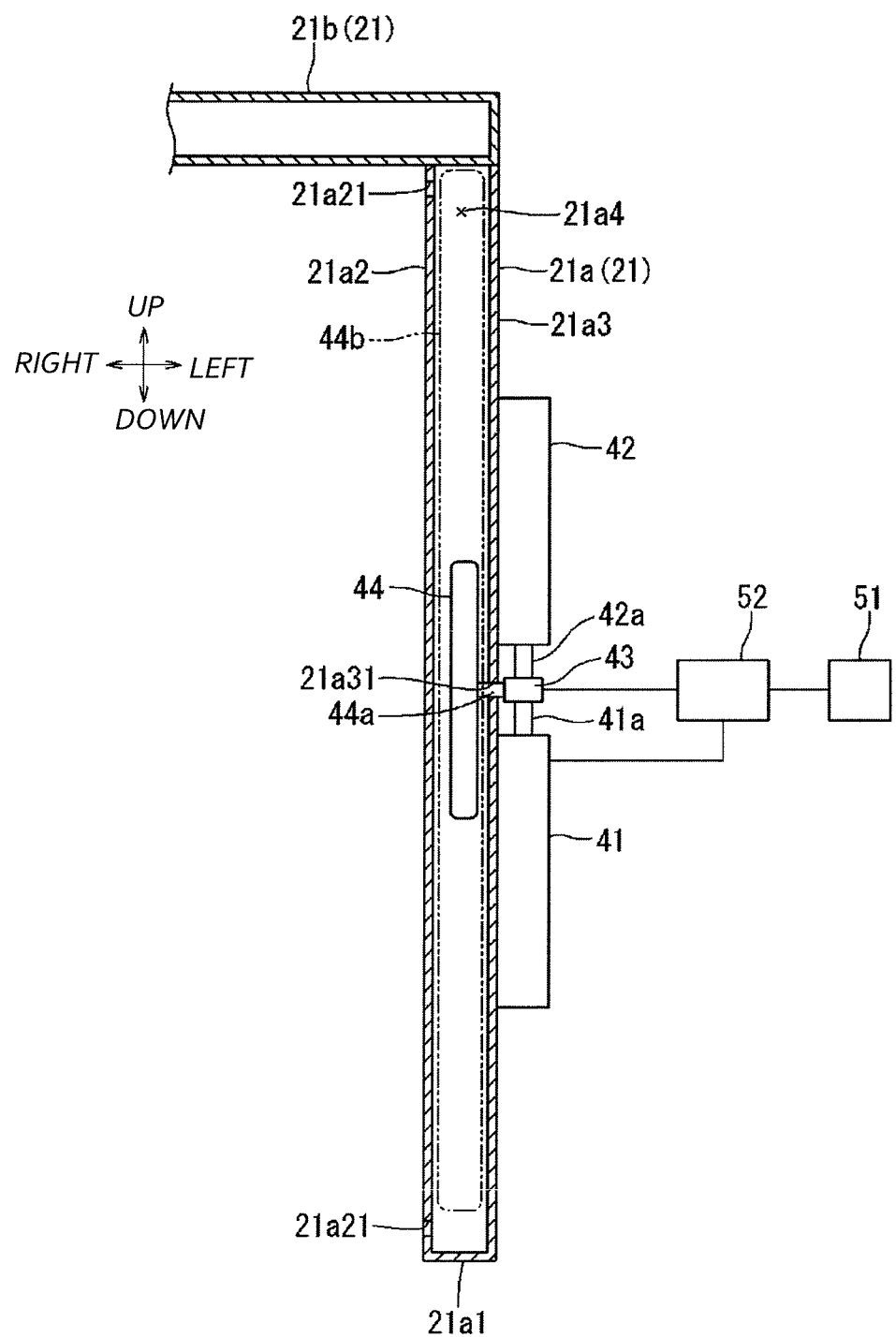
FIG. 2 is a cross-sectional view taken along arrow line II-II of FIG. 1.
Figure 3:
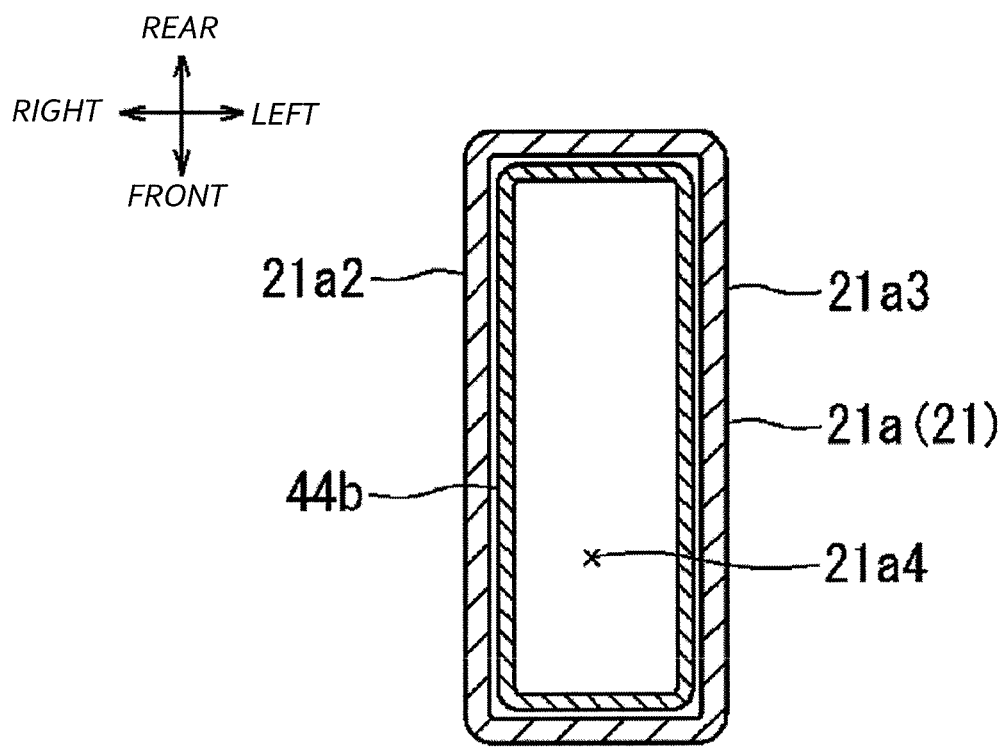
FIG. 3 is a cross-sectional view taken along arrow line III-III of FIG. 1 and illustrating a state where an air bag is deployed.

As illustrated in FIGS. 1 and 2, the pair of side frames 21a of the back frame 21 each are formed such that the rectangular metallic square pipe in which the cross-sectional surface has a long side in the front and rear direction extends in the vertical direction. The upper end of the left side frame 21a abuts on and is connected to the left end of the lower surface of the upper frame 21b, and the lower end of the left side frame 21a is connected to a bottom plate 21a1. With this configuration, an inner space 21a4 is formed in the left side frame 21a. Air vent holes 21a21 are provided near the upper end and the lower end of a right surface 21a2 of the left side frame 21a. The air vent hole 21a21 is provided to smoothly discharge the air in the inner space 21a4 to the outside and not to hinder the deployment of an airbag 44 when the airbag 44 (to be described below) is deployed in the inner space 21a4. The right side frame 21a is the same as the left side frame 21a except that the bottom plate 21a1 and the air vent hole 21a21 are not provided. Herein, the left side frame 21a and the inner space 21a4 respectively correspond to "frame body" and "hollow space" described in the scope of claims. The air vent hole 21a21 corresponds to "opening" described in the scope of claims.

As illustrated in FIG. 2, an inflator 41 which generates gas is disposed on the left lower side (outer lower side) of a left surface 21a3 of the left side frame 21a such that the opposite side of a gas belching pipe 41a to the inflator 41 faces upward. A side airbag 42 is disposed in a folded state on the left upper side (outer upper side) of the left surface 21a3 of the left side frame 21a such that the opposite side of a first gas supply pipe 42a to the side airbag 42 faces downward. The side airbag 42 is deployed between a door panel and the sitting occupant when the vehicle conflicts, and protects the chest and the belly of the sitting occupant. A three-way electromagnetic valve 43 is disposed between the inflator 41 and the side airbag 42 in a state where the upper end of the gas belching pipe 41a is connected to the lower end of the first gas supply pipe 42a. The airbag 44 is disposed in a folded state in the right center portion (inner center portion) of the left surface 21a3 of the left side frame 21a. A through hole 21a31 passing through in the right and left direction is provided in the center portion of the left surface 21a3 of the left side frame 21a, and a second gas supply pipe 44a is disposed to pass through the through hole 21a31. The left end of the second gas supply pipe 44a is connected to the three-way electromagnetic valve 43, and the right end of the second gas supply pipe 44a is connected to the airbag 44. As illustrated in FIGS. 1 and 2, an acceleration sensor 51 and a control device 52 are attached to the floor F on the lower side of the vehicle seat 1. The control device 52 is electrically connected to the acceleration sensor 51, the inflator 41, and the three-way electromagnetic valve 43. Herein, the inflator 41, the three-way electromagnetic valve 43, and the acceleration sensor 51 respectively correspond to "gas supply device", "switching valve", and "impact sensor" described in the scope of claims.

Figure 4:
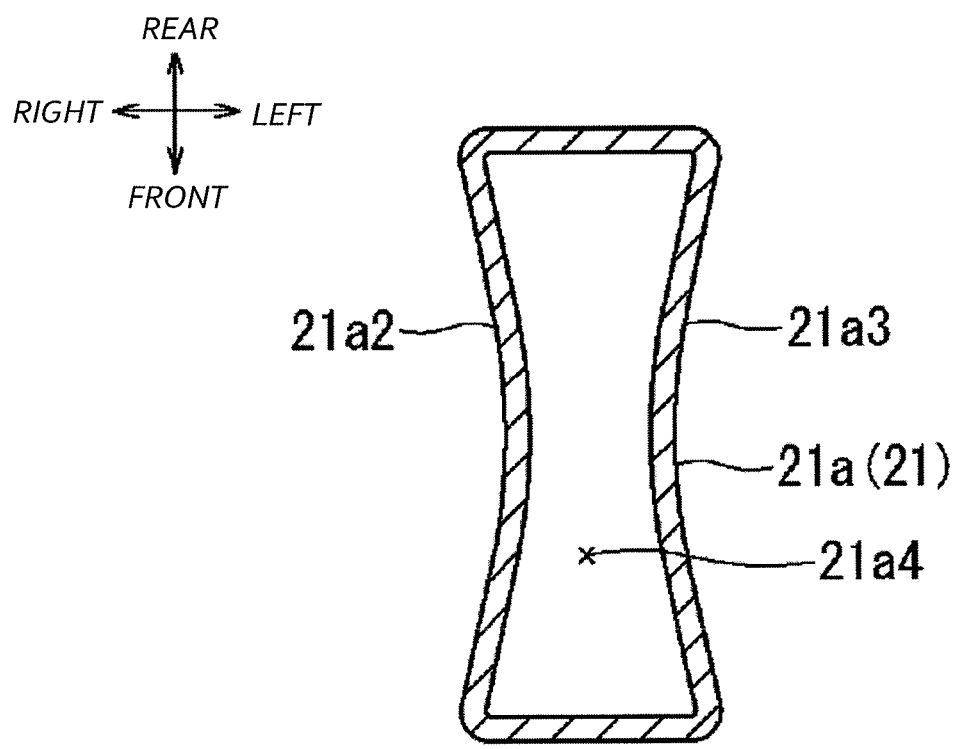
FIG. 4 is a cross-sectional view corresponding to FIG. 3 and illustrating a deformed state when an impact load is applied on a back frame where no airbag is provided.

In a case where an acceleration equal to or more than a predetermined value in the front and rear direction is detected by the acceleration sensor 51, the control device 52 supplies the current to the inflator 41 to cause the inflator 41 to explode gunpowder so as to generate gas. At the same time, the control device 52 supplies the current to the three-way electromagnetic valve 43 in one direction, and the three-way electromagnetic valve 43 switches a state between the gas belching pipe 41a and the second gas supply pipe 44a to a communication state. With this configuration, the gas is supplied from the inflator 41 into the airbag 44, and the airbag 44 is deployed in the inner space 21a4 of the left side frame 21a, and enters a deployed state 44b illustrated by a two-dot chain line in FIG. 2. The deployed state 44b becomes a state in which the airbag is tightly attached on the inside surface of the left side frame 21a surrounding the inner space 21a4. At this time, the deployed state become a state illustrated in FIG. 3 when viewed in horizontal cross section of the left side frame 21a of the seat back 20 in the standard state, such that in the left side frame 21a, the right surface 21a2 is pressed to the right side, and the left surface 21a3 is pressed to the left side. In other words, an inflating force is applied from the inner side to the outside with respect to the left side frame 21a. Therefore, as illustrated in FIG. 4, in a case where the airbag 44 is not disposed in the inner space 21a4 and a bending force in the front and rear direction is applied to the left side frame 21a, it is possible to prevent that the right surface 21a2 and the left surface 21a3 are deformed due to buckling in the inside direction (the direction of the inner space 21a4). In other words, it is possible to improve strength and/or rigidity of the left side frame 21a with respect to the bending in the front and rear direction.

In a case where an acceleration equal to or more than a predetermined value in the right and left direction is detected by the acceleration sensor 51, the control device 52 supplies the current to the inflator 41 to cause the inflator 41 to explode gunpowder so as to generate gas. At the same time, the control device 52 supplies the current to the three-way electromagnetic valve 43 in the other direction, and the three-way electromagnetic valve 43 switches a state between the gas belching pipe 41a and the first gas supply pipe 42a to a communication state. With this configuration, the gas is supplied from the inflator 41 into the side airbag 42, and the side airbag 42 is deployed between the door panel and the sitting occupant so as to protect the chest and the belly of the sitting occupant.

As illustrated in FIG. 1, the airbag 44 and the side airbag 42 are not disposed in the right side frame 21a. However, only the airbag 44 may be disposed in the inner space 21a4 similarly to the left side frame 21a to which the inflator 41 may be connected and attached. In this case, the inflator 41 attached to the right side frame 21a generates gas by exploding gunpowder using the current flowing from the control device 52 in a case where an acceleration equal to or more than a predetermined value in the front and rear direction is detected by the acceleration sensor 51. Therefore, the airbag 44 is deployed also in the inner space 21a4 of the right side frame 21a, and the strength and/or rigidity of the right side frame 21a with respect to the bending in the front and rear direction can be improved similarly to the left side frame 21a.

The embodiment configured as described above has operational effects as follows. When an impact equal to or more than a predetermined value or more is applied to a vehicle body in the front and rear direction and is detected by the acceleration sensor 51, the airbag 44 is deployed to the inner space 21a4 of the side frame 21a. Thus, the side frame 21a is pressed from the inside toward the outside. Therefore, in a case where a bending force in the front and rear direction is applied to the side frame 21a, the right surface 21a2 and the left surface 21a3 are hardly deformed due to buckling in the direction toward the inner space 21a4. The strength and/or the rigidity of the side frame 21a are improved. The airbag 44, the inflator 41, and the three-way electromagnetic valve 43 can be configured with a lighter weight than foamed resin filled in the inner space 21a4, so that it is possible to prevent the back frame 21 from being increased in weight.

Since the air vent hole 21a21 is provided in the side frame 21a, it is not hindered that the airbag 44 is deployed to the inner space 21a4. Since the gas is supplied to the airbag 44 by the inflator 41, it is possible to prevent the back frame 21 from being increased in weight, and to reduce an attaching space. Further, the inflator 41 can be used commonly with the side airbag 42, and the three-way electromagnetic valve 43 can be made with a lighter weight than the inflator 41, so that it is possible to prevent that the weight of the back frame 21 is further increased.

Figure 5:
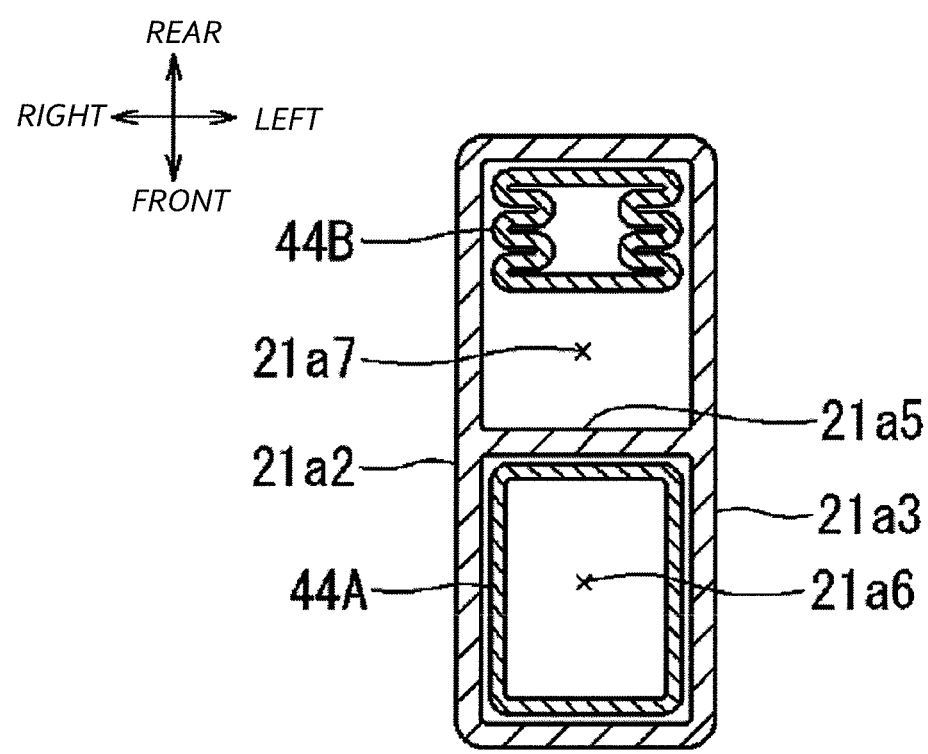
FIG. 5 is a cross-sectional view corresponding to FIG. 3 and illustrating a second embodiment of the present disclosure in a state where an impact load is applied from the front side.
Figure 6:
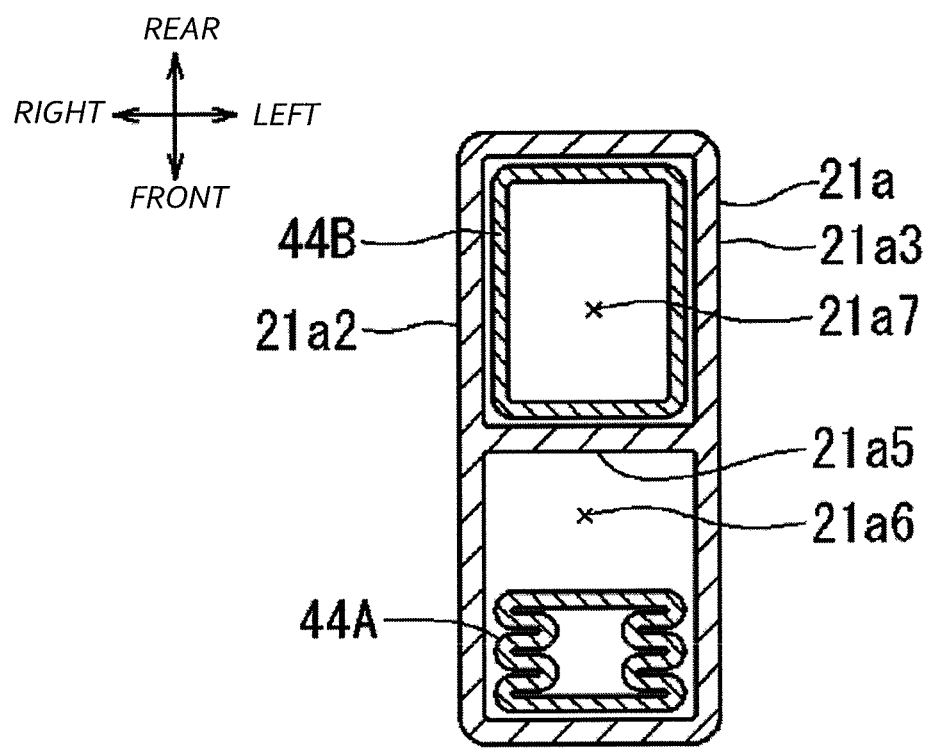
FIG. 6 is a cross-sectional view corresponding to FIG. 3 and illustrating the second embodiment in a state where an impact load is applied from the rear side.

FIGS. 5 and 6 illustrate a second embodiment of the present disclosure. The common structures to the first embodiment will be attached with the corresponding symbol, and the detailed description will be omitted. The second embodiment is different from the first embodiment in that an intermediate surface 21a5 is disposed between the right surface 21a2 and the left surface 21a3 of the side frame 21a to form a front inner space 21a6 and a rear inner space 21a7, and a front airbag 44A and a rear airbag 44B are disposed in the respective inner spaces. Further, the second embodiment is different from the first embodiment in that there are provided with a front three-way electromagnetic valve (not illustrated) which switches the gas supplying to the front airbag 44A or the side airbag 42 and a rear three-way electromagnetic valve (not illustrated) which switches the gas supplying to the rear airbag 44B or the side airbag 42. The front airbag 44A is disposed in the front inner space 21a6 in a folded state, and the rear airbag 44B is disposed in the rear inner space 21a7 in a folded state.

In a case where an acceleration equal to or more than a predetermined value from the front side is detected by the acceleration sensor 51, the control device 52 supplies the current to the inflator 41 to cause the inflator 41 to explode gunpowder so as to generate gas. At the same time, the control device 52 supplies the current to the front three-way electromagnetic valve in one direction, and the front three-way electromagnetic valve switches a state between the gas belching pipe 41a and the second gas supply pipe 44a of the front airbag 44A to a communication state. With this configuration, the gas is supplied from the inflator 41 into the front airbag 44A, and the front airbag 44A is deployed to the front inner space 21a6 of the left side frame 21a so as to enter the state illustrated in FIG. 5. Therefore, in a case where an acceleration equal to or more than a predetermined value is applied from the front side, it is possible to prevent the front part of the right surface 21a2 and the front part of the left surface 21a3, which are easily deformed due to buckling, from being deformed due to buckling in the direction toward the inner space 21a6. In other words, it is possible to efficiently improve strength and/or rigidity of the left side frame 21a with respect to the bending toward the front side.

In a case where an acceleration equal to or more than a predetermined value from the rear side is detected by the acceleration sensor 51, the control device 52 supplies the current to the inflator 41 to cause the inflator 41 to explode gunpowder so as to generate gas. At the same time, the control device 52 supplies the current to the rear three-way electromagnetic valve in one direction, and the rear three-way electromagnetic valve switches a state between the gas belching pipe 41a and the second gas supply pipe 44a of the rear airbag 44B to a communication state. With this configuration, the gas is supplied from the inflator 41 into the rear airbag 44B, and the rear airbag 44B is deployed in the rear inner space 21a7 of the left side frame 21a so as to enter the state illustrated in FIG. 6. Therefore, in a case where an acceleration equal to or more than a predetermined value is applied from the rear side, it is possible to prevent the rear part of the right surface 21a2 and the rear part of the left surface 21a3, which are easily deformed due to buckling, from being deformed due to buckling in the direction toward the rear inner space 21a7. In other words, it is possible to efficiently improve strength and/or rigidity of the left side frame 21a with respect to the bending toward the rear side.

Figure 7:
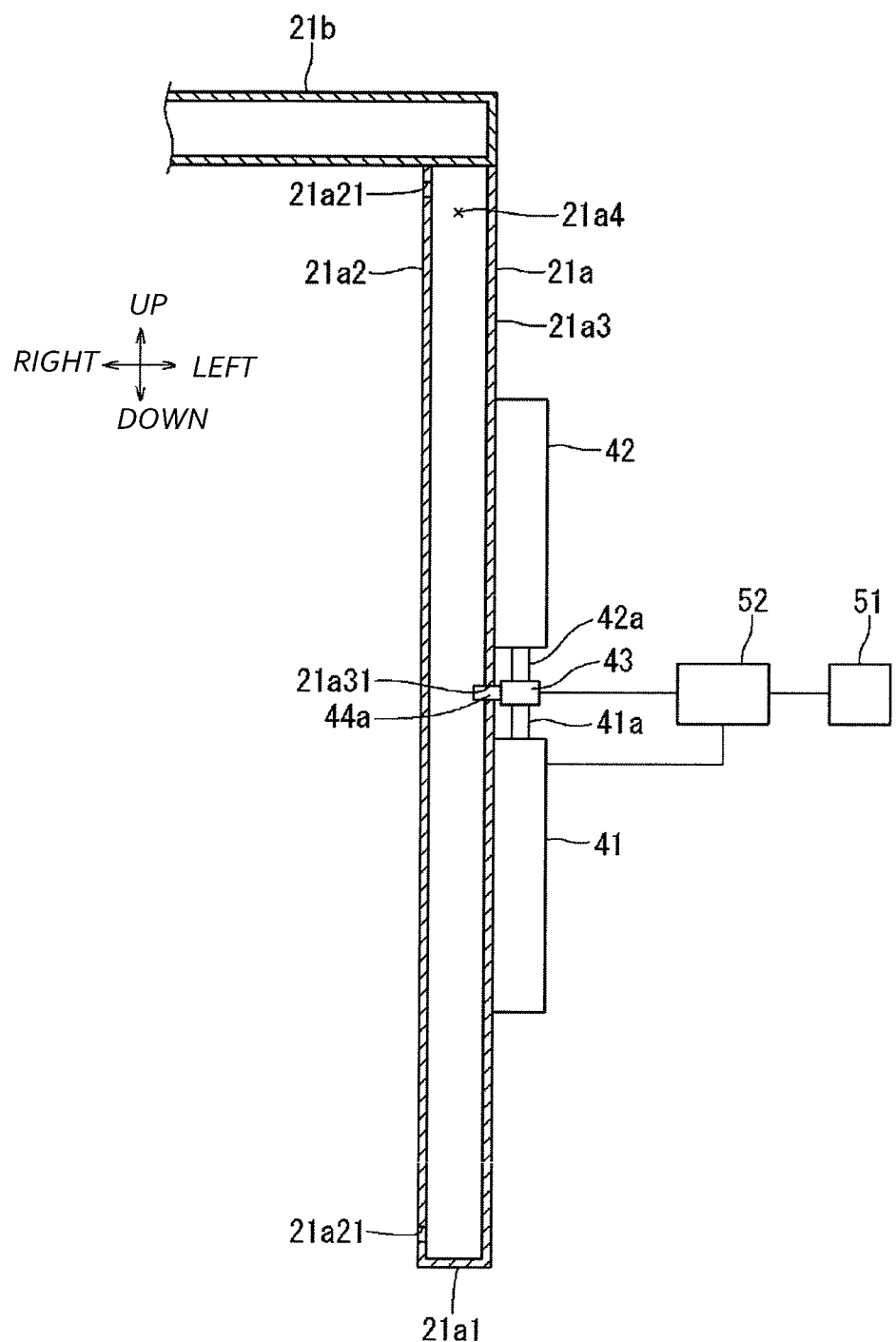
FIG. 7 is a cross-sectional view corresponding to FIG. 2 and illustrating a third embodiment of the present disclosure.

FIG. 7 illustrates a third embodiment of the present disclosure. The common structures to the first embodiment will be attached with the corresponding symbol, and the detailed description will be omitted. The third embodiment is different from the first embodiment in that the airbag 44 is not disposed in the inner space 21a4 of the side frame 21a, and the air vent hole 21a21 is not provided. In other words, the inner space 21a4 is in a sealed state. In a case where an acceleration equal to or more than a predetermined value in the front and rear direction is detected by the acceleration sensor 51, the control device 52 supplies the current to the inflator 41 to cause the inflator 41 to explode gunpowder so as to generate gas. At the same time, the control device 52 supplies the current to the three-way electromagnetic valve 43 in one direction, and the three-way electromagnetic valve 43 switches a state between the gas belching pipe 41a and the second gas supply pipe 44a to a communication state. With this configuration, the gas is supplied from the inflator 41 to the inner space 21a4, and the inner space 21a4 enters a high-pressure state. Therefore, it is possible to prevent the right surface 21a2 and the left surface 21a3 are deformed due to buckling in the direction toward the inner space 21a4 in a case where a bending force in the front and rear direction is applied to the side frame 21a. In other words, it is possible to improve strength and/or rigidity of the side frame 21a with respect to the bending in the front and rear direction. Since there is no need to use the airbag 44, it is possible to prevent an increase in weight of the back frame 21.

Hereinbefore, specific embodiments have been described, but the present invention is not limited to these outer appearances and configurations, and various changes, additions, and omissions may occur within a scope not departing from the spirit of the present invention. For example, the following points may be considered.

1. In the above embodiments, the present invention has been applied to the back frame 21, but is not limited thereto, and may be applied to the cushion frame 11.

2. In the above embodiments, the inflator 41 is used as a gas supply device, however, a high-pressure gas cylinder or a compact electric pump may also be used.

3. In the first embodiment, the inner space 21a4 is formed in the entire side frame 21a. However, the inner space may be formed in a portion where high strength and/or rigidity is desired, and the airbag 44 may be provided therein.

4. In the second embodiment, the inner space 21a4 of the side frame 21a is divided in the front and rear direction and forms the front inner space 21a6 and the rear inner space 21a7. However, the inner space may be divided in the right and left direction to increase strength and/or rigidity with respect to the bending in the front and rear direction and the bending in the right and left direction.

5. In the second embodiment, two three-way electromagnetic valves are used, however, one four-way electromagnetic valve may be used.

6. In the above embodiment, the present invention is applied to a seat of a vehicle, but may be applied a seat which is mounted in a vehicle such as airplanes, ships, trains.

What is claimed is:

1. A vehicle seat frame which is attached to a vehicle body, the vehicle seat frame comprising:
   a frame body that extends along an outer frame of the vehicle seat frame, the frame body having a hollow space therein, and
   an airbag that is disposed inside the hollow space of the frame body,
   wherein gas is supplied into the airbag to deploy the airbag inside the hollow space in a case where an impact equal to or more than a predetermined value is detected.

2. The vehicle seat frame according to claim 1 further comprising:
   an impact sensor that detects an impact.

3. The vehicle seat frame according to claim 1 further comprising:
   a gas supply device connected to the airbag that supplies the gas into the airbag to deploy the airbag inside the hollow space.

4. The vehicle seat frame according to claim 3,
   wherein the gas supply device is attached to the frame body.

5. The vehicle seat frame according to claim 1,
   wherein an opening is provided in the frame body which allows the hollow space of the frame body to communicate with an open air.

6. The vehicle seat frame according to claim 3,
   wherein the gas supply device is an inflator that generates gas when activated.

7. The vehicle seat frame according to claim 6,
   wherein the vehicle seat frame is a back frame of a vehicle seat which supports a back portion of an upper body of a sitting occupant,
   wherein the frame body is comprises side frames that are disposed on right and left sides, respectively, of the back frame,
   at least one of the side frames includes a side airbag which is inflated and deployed at a space at a side of a shoulder and a chest of the sitting occupant, and
   wherein in the side frame provided with the side airbag, the inflator is connected to the side airbag and the airbag through a switching valve which is capable of switching whether the gas is supplied to the side airbag or to the airbag depending on a direction of a detected impact.

8. The vehicle seat frame according to claim 7,
   wherein the hollow space is partitioned into a front room on a front side of a vehicle in the side frame and a rear room on a rear side of the vehicle in the side frame,
   wherein the airbag includes a front room airbag disposed in the front room and a rear room airbag disposed in the rear room, and
   the switching valve is configured such that gas is supplied to the front room airbag when the impact sensor detects an impact from the front side of the vehicle, and gas is supplied to the rear room airbag when the impact sensor detects an impact from the rear side of the vehicle.

9. The vehicle seat frame according to claim 1,
   wherein the frame body comprises a pipe having the hollow space therein.

10. A vehicle seat frame which is attached to a vehicle body, the vehicle seat frame comprising:
    a frame body that extends along an outer frame of the vehicle seat frame, the frame body having an airtight hollow space therein;
    an impact sensor that detects an impact applied to the vehicle body; and
    a gas supply device that supplies gas into the hollow space in a case where an impact equal to or more than a predetermined value is detected by the impact sensor.

11. The vehicle seat frame according to claim 10,
    wherein the frame body comprises a pipe having the hollow space therein.

* * * * *